(12) United States Patent
Ooki

(10) Patent No.: US 12,031,298 B2
(45) Date of Patent: Jul. 9, 2024

(54) WORK MACHINE

(71) Applicant: HITACHI CONSTRUCTION MACHINERY CO., LTD., Tokyo (JP)

(72) Inventor: Takatoshi Ooki, Kasumigaura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 677 days.

(21) Appl. No.: 17/275,757

(22) PCT Filed: Jan. 22, 2020

(86) PCT No.: PCT/JP2020/002137
§ 371 (c)(1),
(2) Date: Mar. 12, 2021

(87) PCT Pub. No.: WO2020/158542
PCT Pub. Date: Aug. 6, 2020

(65) Prior Publication Data
US 2022/0056671 A1  Feb. 24, 2022

(30) Foreign Application Priority Data
Jan. 31, 2019  (JP) ................................ 2019-015049

(51) Int. Cl.
*E02F 9/22*  (2006.01)
*B62D 5/09*  (2006.01)
(Continued)

(52) U.S. Cl.
CPC .............. *E02F 9/225* (2013.01); *B62D 5/091* (2013.01); *B62D 5/28* (2013.01); *B62D 5/30* (2013.01);
(Continued)

(58) Field of Classification Search
CPC .. B62D 5/091; B62D 5/28; B62D 5/30; E02F 9/225; E02F 9/24; E02F 9/26;
(Continued)

(56) References Cited

U.S. PATENT DOCUMENTS

2010/0101888 A1* 4/2010 Nakamura ............. B62D 12/00
180/442
2010/0121530 A1* 5/2010 Suzuki ................. B62D 5/0457
701/41
(Continued)

FOREIGN PATENT DOCUMENTS

JP      04-176776 A     6/1992
JP      2006-282167 A   10/2006
(Continued)

OTHER PUBLICATIONS

Charles Kolstad, "Proportional Solenoid Valve—How They Work," Tameson, published Jan. 4, 2018, available at https://tameson.com/pages/proportional-solenoid-control-valve (Year: 2018).*
(Continued)

*Primary Examiner* — Minnah L Seoh
*Assistant Examiner* — Christopher B Wehrly
(74) *Attorney, Agent, or Firm* — MATTINGLY & MALUR, PC

(57) ABSTRACT

The present invention provides a work machine including a steering device that is very responsive to switching operations. The work machine includes: a proportional solenoid valve for outputting a first pilot pressure oil with a pressure responding to a steering signal; a solenoid valve for outputting a second pilot pressure oil with a predetermined pressure while the steering signal is outputted from the steering device; a switching valve capable of switching to a first state of outputting the first pilot pressure oil to a directional control valve and a second state of outputting the second
(Continued)

pilot pressure oil to the directional control valve, while the first pilot pressure oil is outputted from the proportional solenoid valve and the second pilot pressure oil is outputted from the solenoid valve in parallel; and a controller to switch the switching valve from the first state to the second state in a case where a malfunction is detected in a main circuit ranging from the steering device to the directional control valve via the proportional solenoid valve and the switching valve of the first state.

5 Claims, 6 Drawing Sheets

(51) Int. Cl.
    *B62D 5/28*     (2006.01)
    *B62D 5/30*     (2006.01)
    *E02F 9/24*     (2006.01)
    *E02F 9/26*     (2006.01)
    *F15B 20/00*     (2006.01)

(52) U.S. Cl.
    CPC ................ *E02F 9/24* (2013.01); *F15B 20/00* (2013.01); *E02F 9/26* (2013.01)

(58) Field of Classification Search
    CPC ........ E02F 9/268; F15B 20/00; F15B 20/004; F15B 20/005; F15B 20/007; F15B 20/008; F15B 2211/862; F15B 2211/8623; F15B 2211/863; F15B 2211/8633; F15B 2211/8636; F15B 2211/8752; F15B 2211/8757
    USPC ................ 180/403, 405, 406, 432, 441, 442
    See application file for complete search history.

(56) References Cited

U.S. PATENT DOCUMENTS

| | | | |
|---|---|---|---|
| 2011/0132681 A1* | 6/2011 | Graeve | B62D 6/02 180/422 |
| 2012/0271513 A1* | 10/2012 | Yoneda | B62D 5/0484 701/41 |
| 2015/0330059 A1 | 11/2015 | Tanaka et al. | |
| 2016/0229445 A1* | 8/2016 | Sasaki | B62D 5/0484 |

FOREIGN PATENT DOCUMENTS

| | | |
|---|---|---|
| JP | 2011-121582 A | 6/2011 |
| JP | 2016-114129 A | 6/2016 |
| WO | 2019/017318 A1 | 1/2019 |

OTHER PUBLICATIONS

International Search Report of PCT/JP2020/002137 dated Mar. 7, 2020.

\* cited by examiner

WORK MACHINE

TECHNICAL FIELD

The present invention relates to a work machine to actuate a hydraulic actuator by an electric signal outputted from a steering device.

BACKGROUND ART

An electric operating device including an electric lever to output an electric signal responding to an amount of the operation, a proportional solenoid pressure reducing valve to generate a pilot pressure in accordance with the electric signal outputted from the electric lever, and a directional control valve to control an opening by the pilot pressure generated by the proportional solenoid pressure reducing valve has heretofore been known.

In an electric operating device described in Patent Literature 1, for example, a main operating device and a sub operating device are provided in parallel, and a work machine can be operated safely by switching the main operating device to the sub operating device in a case where something goes wrong with the main operating device.

CITATION LIST

Patent Literature

Patent Literature 1: Japanese Unexamined Patent Application Publication No. 2016-114129

SUMMARY OF INVENTION

Technical Problem

An electric operating device in Patent Literature 1 can be applied to a steering circuit in a work machine, for example. If such an electric operating device is applied to a wheel-type work machine that moves at a high speed, however, there is the problem of causing an inoperable state while an operator who recognize a malfunction shifts from a main operating device to a sub operating device.

An object of the present invention is to provide a technology of enhancing switching responsiveness in a work machine that can be operated continuously by switching a steering circuit in a case where a malfunction occurs.

Solution to Problem

In order to attain the above object, an embodiment of a work machine according to the present invention, in the work machine, comprises:
a hydraulic pump;
a steering actuator; and
a directional control valve to control a pressure oil supplied from the hydraulic pump and supplied to the steering actuator;
the work machine actuating the steering actuator by the directional control valve controlled by a steering signal outputted from a steering device according to an amount of the operation by an operator,
wherein the work machine comprises:
a proportional solenoid valve for outputting a first pilot pressure oil with a pressure responding to the steering signal;
a solenoid valve for outputting a second pilot pressure oil with a predetermined pressure while the steering signal is outputted from the steering device;
a switching valve capable of switching to a first state of outputting the first pilot pressure oil to the directional control valve and a second state of outputting the second pilot pressure oil to the directional control valve, while the first pilot pressure oil is outputted from the proportional solenoid valve and the second pilot pressure oil is outputted from the solenoid valve in parallel; and
a controller to switch the switching valve from the first state to the second state in a case where a malfunction is detected in a main circuit ranging from the steering device to the directional control valve via the proportional solenoid valve and the switching valve of the first state.

Advantageous Effects of Invention

The present invention makes it possible to enhance switching responsiveness in a work machine that can be operated continuously by switching a steering circuit in a case where a malfunction occurs. Here, problems, configurations, and effects other than those described above will be obvious in the descriptions of the following embodiments.

DESCRIPTION OF EMBODIMENT

Figure 1:
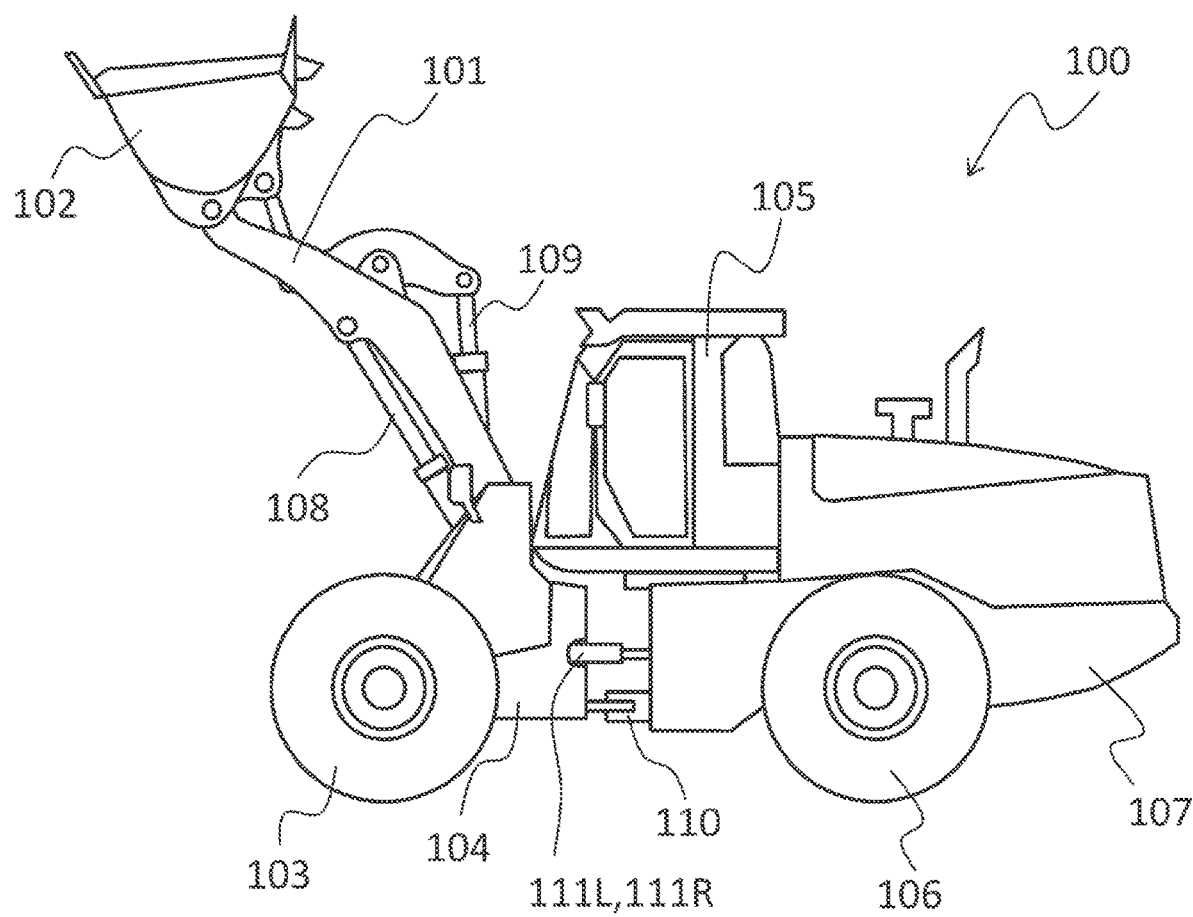
FIG. 1 is a side view of a wheel loader according to an embodiment of the present invention.

Embodiments of a wheel loader that is an example of a work vehicle according to the present invention are hereunder explained in reference to the drawings. Here, the same reference numerals are given to the same configurations in respective embodiments, and duplicate description is omitted.

FIG. 1 is a side view of a wheel loader 100 according to an embodiment of the present invention. The wheel loader 100 that is an example of a work machine includes a lift arm 101, a bucket 102, a front frame 104 having a pair of left and right front wheels 103, and the like, a cab 105, and a rear frame 107 having a pair of left and right rear wheels 106, and the like.

The front wheels 103 and the rear wheels 106 are driven by an engine mounted on the wheel loader 100. More specifically, the driving force of the engine is changed by a transmission via a torque converter and further is transmitted to the front wheels 103 and the rear wheels 106 via a propeller shaft and an axle.

The lift arm 101 moves rotationally in the vertical direction (looks up and down) by actuating of a lift arm cylinder 108. The bucket 102 moves rotationally in the vertical direction (clouds or dumps) by actuating of a bucket cylinder 109. The lift arm 101, the bucket 102, the lift arm cylinder 108, and the bucket cylinder 109 constitute a front work device.

The front frame 104 and the rear frame 107 are rotatably connected to each other by a connecting shaft 110. The front frame 104 and the rear frame 107 are connected by a pair of steering cylinders 111L and 111R provided on the left and right of the connecting shaft 110. The paired left and right steering cylinders 111L and 111R correspond to a "steering actuator" according to the present invention.

The front frame 104 bends around the connecting shaft 110 left and right with respect to the rear frame 107 by expanding one of the paired steering cylinders 111L and 111R and contracting the other by a steering circuit 10 that will be described later. Accordingly, the relative mounting angle between the front frame 104 and the rear frame 107 changes, and the vehicle body bends and steers. In other words, the wheel loader 100 is of an articulated type in which the front frame 104 and the rear frame 107 are bent around the connecting shaft 110.

A steering lever 11 (refer to FIG. 2) to expand and contract the steering cylinders 111L and 111R is installed in the cab 105. The steering lever 11 corresponds to a steering device. Although they are not shown in the figures, in the cab 105, an arm operation lever to expand and contract the lift arm cylinder 108, a bucket operation lever to expand and contract the bucket cylinder 109, an accelerator pedal to adjust an engine speed, a brake pedal to brake the front wheels 103 and the rear wheels 106, and other are installed.

Further, in the cab 105, a notification device 24 (refer to FIG. 2) to notify various information to a operator is installed. The notification device 24 is a display, a warning lamp, a speaker, and the like, for example. That is, a operator in the cab 105 can operate the steering lever 11, etc. while checking the notification device 24.

Figure 2:
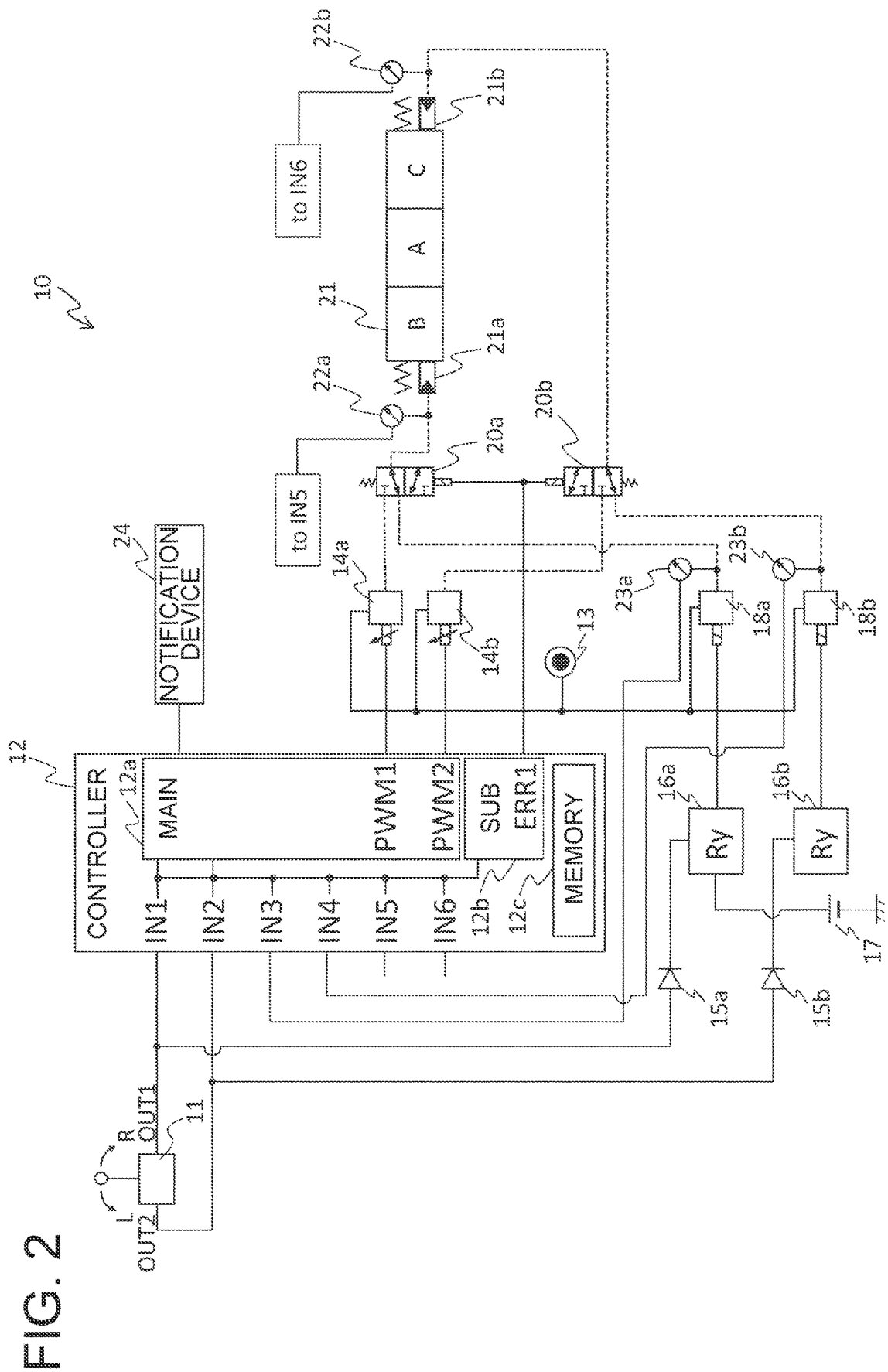
FIG. 2 is a block diagram of a steering circuit in a wheel loader.

FIG. 2 is a block diagram of the steering circuit 10 in the wheel loader 100. The steering circuit 10 is a device to actuate (expand and contract) the steering cylinders 111L and 111R in accordance with the operation of a operator to the steering lever 11. The steering circuit 10 mainly includes a steering lever 11, a controller 12, a pressure source 13, proportional solenoid pressure reducing valves 14a and 14b, diodes 15a and 15b, relays 16a and 16b, a power source 17, solenoid valves 18a and 18b, switching valves 20a and 20b, a directional control valve 21, first pressure sensors 22a and 22b, and second pressure sensors 23a and 23b.

Figure 3:
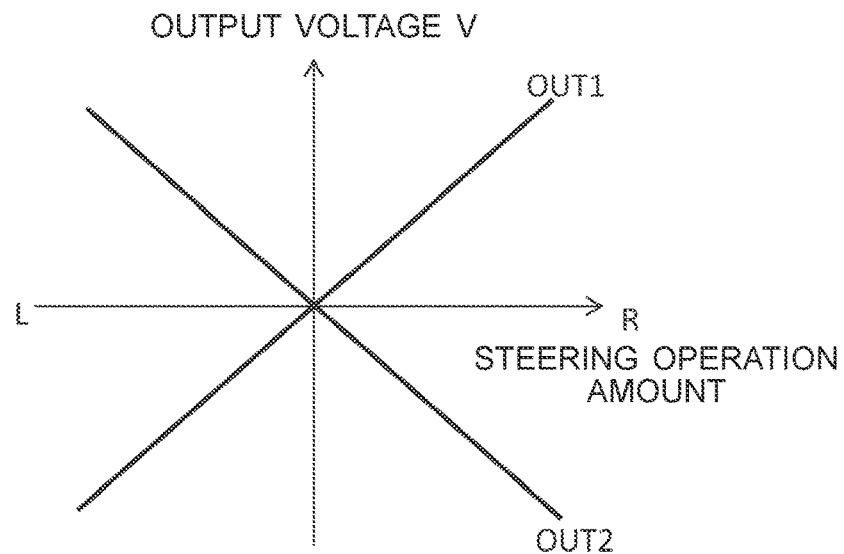
FIG. 3 is a graph showing a relationship between an amount of the operation of a steering lever and an output voltage V.

The steering lever 11 outputs a voltage value (steering signal) corresponding to the amount of the operation by an operator to the controller 12 and the diode 15a or 15b through OUT1 or OUT2. FIG. 3 is a graph showing a relationship between an amount of the operation of the steering lever 11 and an output voltage V. In a case where the steering lever 11 is tilted to the right, a positive voltage is outputted to OUT1 and a negative voltage is outputted to OUT2. In contrast, in a case where the steering lever 11 is tilted to the left, a negative voltage is outputted to OUT1 and a positive voltage is outputted to OUT2. Further, as the amount of the operation of the steering lever 11 increases, the absolute values of the voltages outputted to OUT1 and OUT2 increase.

The controller 12 controls the operations of the proportional solenoid pressure reducing valves 14a and 14b, the switching valves 20a and 20b, and the notification device 24 on the basis of a voltage value outputted from the steering lever 11, measured voltages Va1 measured by the first pressure sensors 22a and 22b, and measured voltages Va2 measured by the second pressure sensors 23a and 23b. The controller 12 mainly includes a main controller 12a, a sub controller 12b, and a memory 12c, for example.

The controller 12 includes a CPU (Central Processing Unit), a ROM (Read Only Memory), a RAM (Random Access Memory), and the like. Then respective processes that will be described later are realized by the CPU reading and executing programs from the ROM and the RAM. A concrete configuration of the controller 12, however, is not limited to this, and the processes may also be realized by hardware such as an ASIC (Application Specific Integrated Circuit) and an FPGA (Field-Programmable Gate Array).

The main controller 12a adjusts the opening of the proportional solenoid pressure reducing valve 14a or 14b in accordance with a voltage value outputted from the steering lever 11. The sub controller 12b: switches the state of the switching valve 20a or 20b on the basis of a voltage value outputted from the steering lever 11, a measured voltage Va1 measured by the first pressure sensor 22a or 22b, a measured voltage Va2 measured by the second pressure sensor 23a or 23b, and health information obtained from the main controller 12a; and notifies a malfunction in the steering circuit 10 through the notification device 24. The memory 12c stores input voltage-target pilot pressure tables (conversion tables) 31a and 31b and target pilot pressure-target solenoid current tables 32a and 32b shown in FIG. 6.

Figure 6:
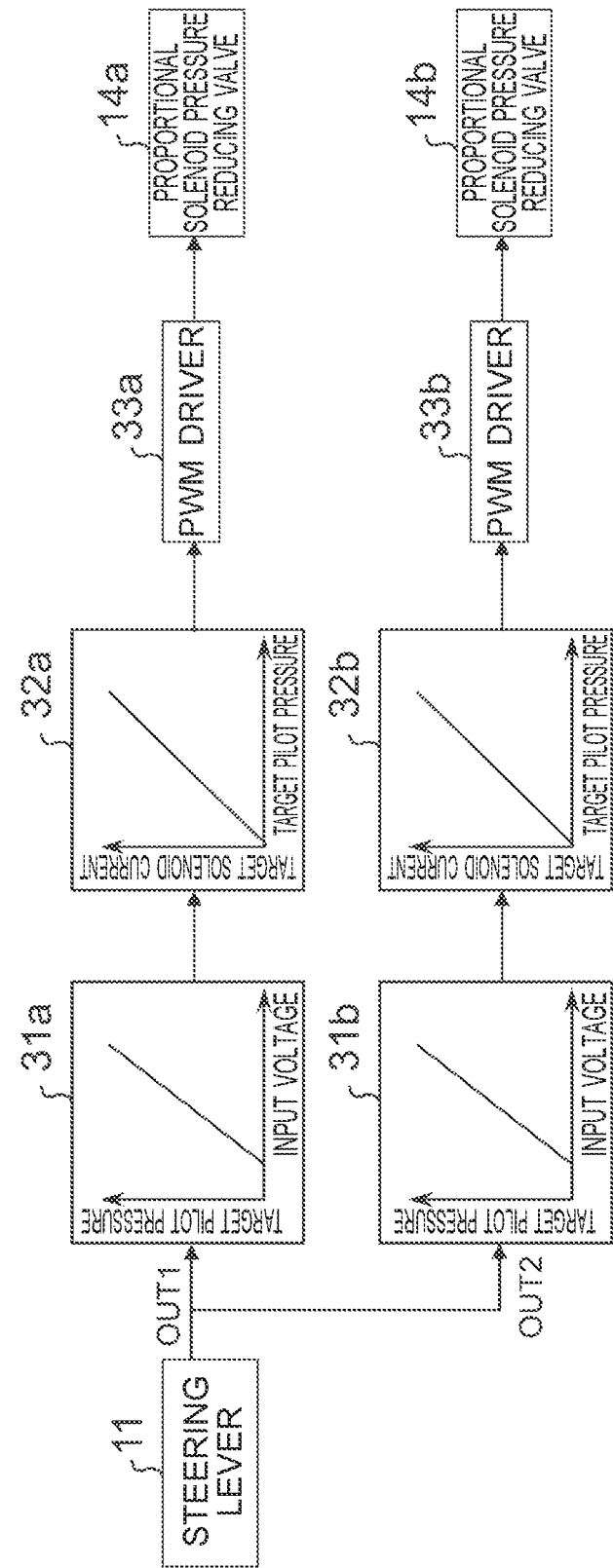
FIG. 6 is a view showing processing of a main controller.

FIG. 6 is a view showing processing of the main controller 12a. The input voltage-target pilot pressure table 31a or 31b shows a relationship between a voltage value outputted from the steering lever 11 and a target pressure Pt1 of a first pilot pressure oil to be outputted from the proportional solenoid pressure reducing valve 14a or 14b. The target pilot pressure-target solenoid current table 32a or 32b shows a relationship between the target pressure Pt1 specified by the input voltage-target pilot pressure table 31a or 31b and a target current value of a PWM signal to adjust the opening of the proportional solenoid pressure reducing valve 14a or 14b.

The main controller 12a calculates a target pressure Pt1 corresponding to a voltage value outputted from OUT1 in the steering lever 11 on the basis of the input voltage-target pilot pressure table 31a. Successively, the main controller 12a calculates a target current value corresponding to the calculated target pressure Pt1 on the basis of the target pilot pressure-target solenoid current table 32a. Then the main controller 12a controls a PWM driver 33a and outputs a PWM signal corresponding to the target current value to the proportional solenoid pressure reducing valve 14a.

That is, the proportional solenoid pressure reducing valve 14a opens in a case where the voltage value of OUT1 is higher than a predetermined value and closes in a case where the voltage value of OUT1 is lower than a predetermined value (including a negative voltage value). Further, the opening of the proportional solenoid pressure reducing valve 14a increases as the voltage value of OUT1 increases. The same applies to a method of adjusting the opening of the proportional solenoid pressure reducing valve 14b by using a voltage value outputted from OUT2 in the steering lever 11, the input voltage-target pilot pressure table 31b, the target pilot pressure-target solenoid current table 32b, and a PWM driver 33b.

The pressure source 13 supplies a pressure oil with a pilot primary pressure to the proportional solenoid pressure reducing valves 14a and 14b and the solenoid valves 18a and 18b. The pressure source 13 includes a tank to store a hydraulic oil, a hydraulic pump to pump the hydraulic oil stored in the tank, and the like, for example. The pilot primary pressure is set so as to be higher than the maximum value of the target pressure Pt1 of the first pilot pressure oil and the maximum value of a target pressure Pt2 of a second pilot pressure oil that will be described later.

The proportional solenoid pressure reducing valve 14a or 14b: reduces the pilot primary pressure to the target pressure Pt1 in accordance with the PWM signal outputted from the main controller 12a; and outputs the first pilot pressure oil reduced to the target pressure Pt1 to the switching valve 20a or 20b. That is, the proportional solenoid pressure reducing valve 14a or 14b outputs the first pilot pressure oil with a higher pressure as the current value of the PWM signal increases. In other words, the first pilot pressure oil is outputted from one of the proportional solenoid pressure reducing valves 14a and 14b at a pressure responding to the positive steering signal in the paired steering signals R and L outputted from the steering lever 11.

Figure 4:
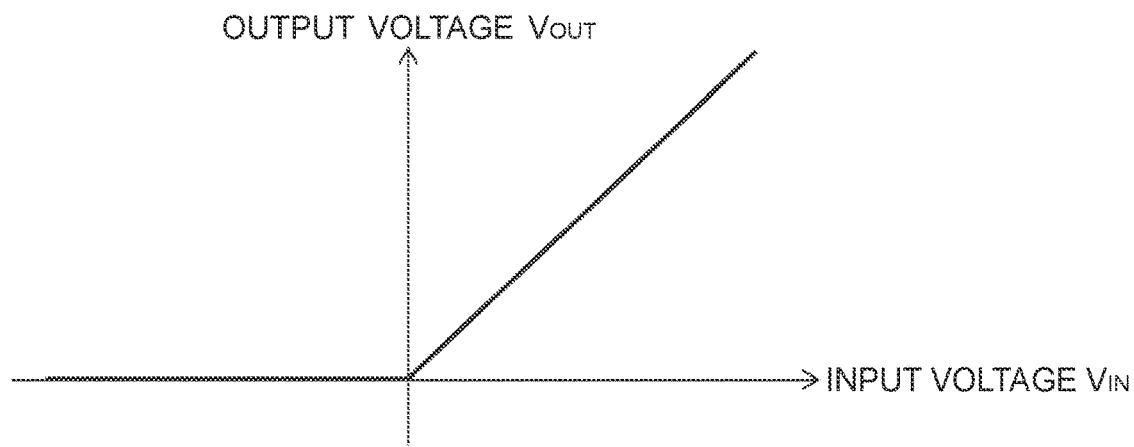
FIG. 4 is a graph showing a relationship between an input voltage and an output voltage in a diode.

The diode 15a or 15b rectifies and outputs a steering signal outputted from the steering lever 11. FIG. 4 is a graph showing a relationship between an input voltage (OUT1 or OUT2) and an output voltage in the diode 15a or 15b. As shown in FIG. 4, in a case where the steering lever 11 is tilted to the right, the diode 15a passes the steering signal R of OUT1 and the diode 15b does not pass the steering signal L of OUT2. Further, in a case where the steering lever 11 is tilted to the left, the diode 15a does not pass the steering signal R of OUT 1 and the diode 15b passes the steering signal L of OUT2.

In this way, the diode 15a or 15b: passes only the steering signal of a positive voltage value, of the steering signals outputted from the steering lever 11; and does not pass the steering signal of a negative voltage value. Further, as the voltage value outputted from OUT1 or OUT2 increases, the voltage value outputted from the diode 15a or 15b increases. That is, the diode 15a or 15b passes only a steering signal corresponding to the steering lever 11 operated in a predetermined direction.

Figure 5:
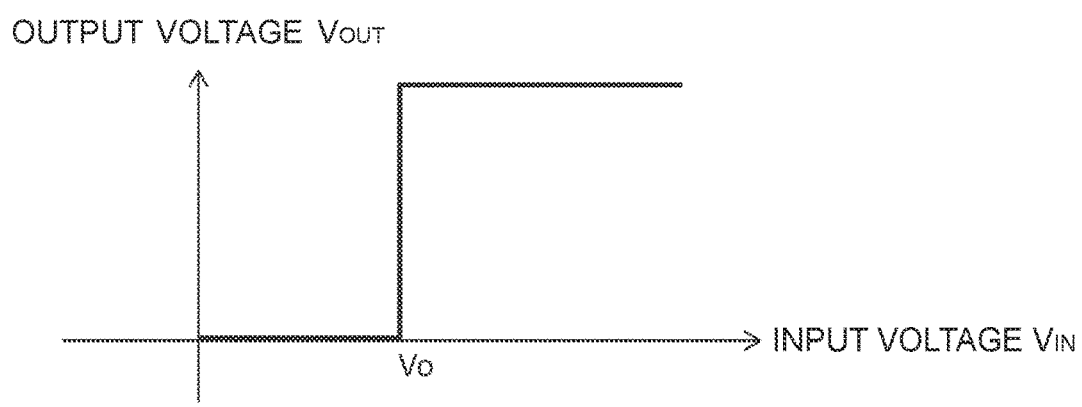
FIG. 5 is a graph showing a relationship between an input voltage value and an output voltage value in a relay.

The relay 16a or 16b applies a voltage (instruction signal) supplied from the power source 17 to the solenoid valve 18a or 18b according to the diode 15a or 15b having passed a steering signal. FIG. 5 is a graph showing a relationship between an input voltage value and an output voltage value in the relay 16a or 16b. That is, the relay 16a or 16b outputs an instruction signal of a predetermined voltage value according to the diode 15a or 15b having passed a steering signal of a predetermined voltage value V0 or higher. The instruction signal is a signal for causing the solenoid valve 18a or 18b to output the second pilot pressure oil with a predetermined pressure.

The solenoid valve 18a or 18b: reduces the pilot primary pressure supplied from the pressure source 13 to a predetermined target pressure Pt2; and outputs a second pilot pressure oil reduced to the target pressure Pt2 to the switching valve 20a or 20b while the instruction signal is outputted from the relay 16a or 16b. On the other hand, the solenoid valve 18a or 18b does not output a second pilot pressure oil while the instruction signal is not outputted from the relay 16a or 16b.

The switching valve 20a or 20b outputs only one of the first pilot pressure oil supplied from the proportional solenoid pressure reducing valve 14a or 14b and the second pilot pressure oil supplied from the solenoid valve 18a or 18b to a pilot chamber 21a or 21b in the directional control valve 21. More specifically, the switching valves 20a and 20b are configured so as to be switchable between a first state of passing the first pilot pressure oil and not passing the second pilot pressure oil and a second state of not passing the first pilot pressure oil and passing the second pilot pressure oil.

That is, the first pilot pressure oil and the second pilot pressure oil are always supplied to the switching valves 20a and 20b while the steering lever 11 is operated. Then the switching valves 20a and 20b output only one of the first pilot pressure oil and the second pilot pressure oil in accordance with the control of the sub controller 12b. Here, the switching valves 20a and 20b may also be configured so as to: be urged to the second state (initial state) by urging members such as springs; and maintain the first state only while an instruction signal is outputted from the sub controller 12b.

The directional control valve 21 supplies a hydraulic oil to the steering cylinders 111L and 111R in accordance with a pilot pressure oil supplied to the pilot chamber 21a or 21b. Here, the directional control valve 21 is a proportional valve in which a supply amount (supply speed) of the hydraulic oil supplied to the steering cylinders 111L and 111R increases as the pressure of the supplied pilot pressure oil increases. The directional control valve 21 is configured so as to be switchable to the states A, B, and C.

The directional control valve 21 is maintained in the state A (initial state) while the pilot pressure oil is not supplied to both the pilot chambers 21a and 21b. The directional control valve 21 in the state A keeps the steering cylinders 111L and 111R in a stationary state. That is, the steering angle of the wheel loader 100 is maintained while the directional control valve 21 is in the state A.

In a case where the steering lever 11 is tilted to the right, the pilot pressure oil is supplied to the pilot chamber 21a. Accordingly, the directional control valve 21 is switched from the state A to the state B. The directional control valve 21 in the state B supplies the hydraulic oil to the bottom chamber of the steering cylinder 111L and the rod chamber of the steering cylinder 111R. On the other hand, the hydraulic oil in the rod chamber of the steering cylinder 111L and the bottom chamber of the steering cylinder 111R is discharged to a tank (not shown in the figures). Accordingly, the steering cylinder 111L expands and the steering cylinder 111R contracts. As a result, the front frame 104 bends to the right with respect to the rear frame 107 and the steering of the wheel loader 100 turns to the right.

In a case where the steering lever 11 is tilted to the left, the pilot pressure oil is supplied to the pilot chamber 21b. Accordingly, the directional control valve 21 is switched from the state A to the state C. The directional control valve 21 in the state C supplies the hydraulic oil to the rod chamber of the steering cylinder 111L and the bottom chamber of the steering cylinder 111R. On the other hand, the hydraulic oil in the bottom chamber of the steering cylinder 111L and the rod chamber of the steering cylinder 111R is discharged to a tank (not shown in the figures). Accordingly, the steering cylinder 111L contracts and the steering cylinder 111R expands. As a result, the front frame 104 bends to the left with respect to the rear frame 107 and the steering of the wheel loader 100 turns to the left.

The first pressure sensor 22a or 22b: measures the pressure value of the pilot pressure oil outputted from the switching valve 20a or 20b, in other words the pilot pressure oil supplied to the pilot chamber 21a or 21b in the directional control valve 21; and outputs the pressure value as a pressure Pa1 to the controller 12. The second pressure sensor 23a or 23b: measures the pressure value of the second pilot pressure oil outputted from the solenoid valve 18a or 18b, in other words the second pilot pressure oil supplied to the switching valve 20a or 20b; and outputs the pressure value as a pressure Pa2 to the controller 12.

Meanwhile, in the steering circuit 10 shown in FIG. 2, the circuit ranging from the steering lever 11 to the directional control valve 21 via the main controller 12a, the proportional solenoid pressure reducing valves 14a and 14b, and the switching valves 20a and 20b in the first state is referred to as a "main circuit" and the circuit ranging from the steering lever 11 to the solenoid valves 18a and 18b via the diodes 15a and 15b and the relays 16a and 16b is referred to as a "sub circuit". Here, the sub circuit may further include the circuit ranging from the solenoid valves 18a and 18b to the directional control valve 21 via the switching valves 20a and 20b in the second state.

Figure 7:
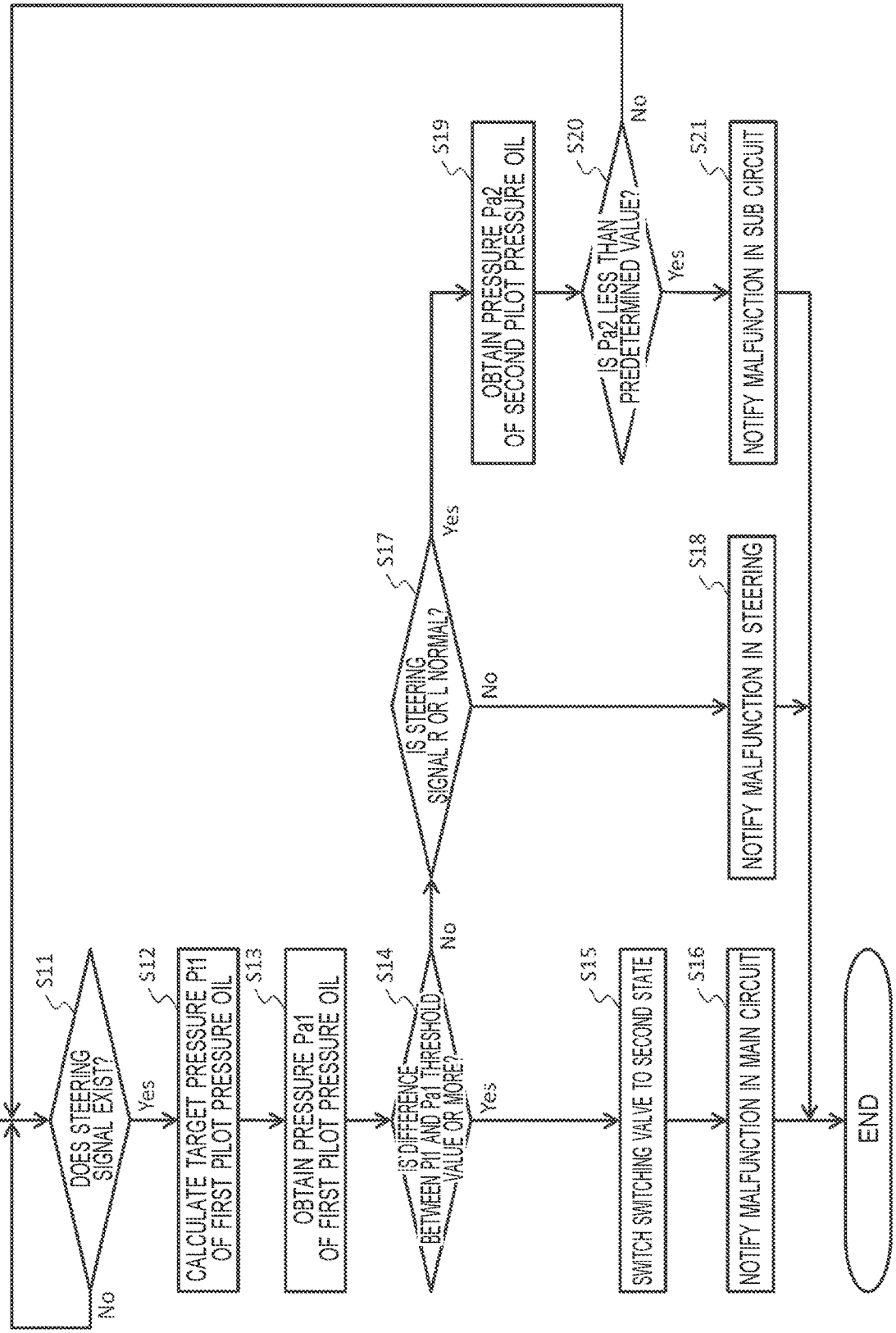
FIG. 7 is a flowchart of malfunction detection processing.

Malfunction detection processing executed by the sub controller 12b is explained hereunder in reference to FIG. 7. FIG. 7 is a flowchart of malfunction detection processing. Here, at the start of the malfunction detection processing, it is assumed that the sub controller 12b outputs an instruction signal to the switching valves 20a and 20b. In other words, the switching valves 20a and 20b are maintained in the first state.

Firstly, the sub controller 12b monitors the output of a steering signal from the steering lever 11 (S11). Then, the sub controller 12b calculates a target pressure Pt1 of the first pilot pressure oil (S12) on the basis of the voltage value of the steering signal and the input voltage-target pilot pressure table 31a or 31b according to the steering signal being outputted from the steering lever 11 (S11: Yes). Further, the sub controller 12b obtains a pressure Pa1 measured by the first pressure sensor 22a or 22b (S13). Here, the switching valves 20a and 20b are in the first state, and hence the pressure Pa1 means the pressure value of the first pilot pressure oil.

That is, in a case where the steering lever 11 is tilted to the right, the sub controller 12b: calculates a target pressure Pt1 corresponding to the voltage value of the steering signal R of OUT1 on the basis of the input voltage-target pilot pressure table 31a (S12); and obtains a pressure Pa1 of the first pilot pressure oil supplied to the pilot chamber 21a from the first pressure sensor 22a (S13). On the other hand, in a case where the steering lever 11 is tilted to the left, the sub controller 12b: calculates a target pressure Pt1 corresponding to the voltage value of the steering signal L of OUT2 on the basis of the input voltage-target pilot pressure table 31b (S12); and obtains a pressure Pa1 of the first pilot pressure oil supplied to the pilot chamber 21b from the first pressure sensor 22b (S13).

Successively, the sub controller 12b compares the target pressure Pt1 with the pressure Pa1 (S14). Then, the sub controller 12b detects a malfunction in the main circuit and switches the solenoid valve 18a or 18b from the first state to the second state (S15) according to judging that the difference between the target pressure Pt1 and the pressure Pa1 is a threshold value or more (S14: Yes). That is, the sub controller 12b stops the instruction signal that continues to be outputted to the switching valves 20a and 20b. Accordingly, the switching valves 20a and 20b are switched from the first state to the second state by urging members.

Further, the sub controller 12b notifies a malfunction in the main circuit to a operator through the notification device 24 (S16) according to detecting the malfunction in the main circuit (S14: Yes). A specific notification method is not particularly limited but a message may be displayed in a display, a warning lamp may be lit or blinked, or an alarm may be outputted from a speaker, for example. The same applies to the notification methods at Steps S18 and S21 that will be described later.

On the other hand, the sub controller 12b judges that the main circuit operates normally and advances to the processes after Step S17 without executing the processes of Steps S15 and S16 according to judging that the difference between the target pressure Pt1 and the pressure Pa1 is less than a threshold value (S14: No). That is, the switching valves 20a and 20b are maintained in the first state. Successively, the sub controller 12b compares the steering signal R outputted from OUT1 with the steering signal L outputted from OUT2 (S17).

Here, as it will be obvious in reference to FIG. 3, the ideal values of the steering signals R and L are voltage values the absolute values of which are the same and the signs of which are inverted. That is, theoretically the sum of the voltage values of the steering signals R and L is zero. The sub controller 12b may judge that the steering signals R and L are normal in a case where the difference between the absolute values of the steering signals R and L is less than a predetermined value and the signs of the steering signals R and L are inverted, for example. On the other hand, the sub controller 12b may judge that the steering signals R and L are abnormal in a case where the difference between the absolute values of the steering signals R and L is a predetermined value or more or the signs of the steering signals R and L are the same.

Then the sub controller 12b notifies a malfunction in the steering lever 11 through the notification device 24 (S18) according to judging that the steering signals R and L are abnormal (S17: No). On the other hand, the sub controller 12b advances to the processes after Step S19 without executing Step S18 according to judging that the steering signals R and L are normal (S17: Yes).

Successively, the sub controller 12b obtains the pressure Pa2 of the second pilot pressure oil from the second pressure sensor 23a or 23b (S19). Successively, the sub controller 12b judges whether or not the pressure Pa2 is less than a predetermined value (S20). More specifically, the sub controller 12b judges whether or not the pressure Pa2 obtained from the second pressure sensor 23a is less than a predetermined value in a case where the steering signal R is a positive voltage value. On the other hand, the sub controller 12b judges whether or not the pressure Pa2 obtained from the second pressure sensor 23b is less than a predetermined value in a case where the steering signal L is a positive voltage value.

Then the sub controller 12b notifies a malfunction in the sub circuit through the notification device 24 (S21) according to judging that the pressure Pa2 is less than a predetermined value (S20: Yes). On the other hand, the sub controller 12b returns to S11 and continues the processes without executing the process of S21 according to judging that the pressure Pa2 is a predetermined value or more (S20: No). That is, the malfunction detection processing in FIG. 7 continues until some malfunction is detected in the steering circuit 10.

The above embodiment provides the following working effects.

In the above embodiment, both the first pilot pressure oil and the second pilot pressure oil are always supplied to the switching valves 20a and 20b in parallel. Therefore, in a case where a malfunction in the main circuit is detect and the switching valve 20a or 20b is switched from the first state to the second state (S14: Yes), the second pilot pressure oil is supplied instantly to the pilot chamber 21a or 21b. That is, the wheel loader 100 can continue to turn in the operating direction of the steering lever 11 even if a malfunction occurs in the main circuit. That is, high responsiveness can be achieved at the time of switching from the main circuit to the sub circuit.

Whereas the pressure of the first pilot pressure oil varies according to the tilt amount of the steering lever 11, however, the pressure of the second pilot pressure oil is fixed regardless of the tilt amount of the steering lever 11. Therefore, in a case where the switching valve 20a or 20b is switched to the second state, a steering angle cannot be adjusted by the steering lever 11.

The above embodiment therefore is configured so that the second pilot pressure oil may be supplied to the switching valve 20a or 20b only if a voltage value inputted to the relay 16a or 16b is a predetermined voltage value VO or larger. Accordingly, in a case where the tilt amount of the steering lever 11 is small (in other words, the steering of the wheel loader 100 is fixed), the second pilot pressure oil is not supplied to the directional control valve 21 even if the switching valve 20a or 20b is switched to the second state. As a result, the steering angle of the wheel loader 100 can be prevented from increasing at the timing of causing a malfunction in the main circuit.

Further, in the above embodiment, by configuring the sub circuit so as to include the diodes 15a and 15b, the relays 16a and 16b, and the solenoid valves 18a and 18b that are incapable of proportional control, the rate of malfunction in the sub circuit can be lower than that in the main circuit. Accordingly, in a case where a malfunction occurs in the main circuit, the sub circuit can be functioned without fail.

Furthermore, according to the above embodiment, an operator can stop the wheel loader 100 safely by switching the switching valve 20a or 20b and continuing to turn the wheel loader 100 and also by notifying a malfunction in the main circuit. In addition, according to the above embodiment, in a case where abnormalities in the steering lever 11 and the sub circuit are detected (S17: No/S20: Yes), those are also notified to a operator (S18/S21), and hence the degree of safety in the wheel loader 100 improves further.

Meanwhile, a concrete method for detecting a malfunction in the main circuit is not limited to Step S14 in FIG. 7. As another example, the wheel loader 100 may include an expansion and contraction sensor to detect an expansion and contraction amount of the steering cylinder 111L or 111R. Then, the sub controller 12b may detect a malfunction in the main circuit by consistency between a steering signal outputted from the steering lever 11 and an expansion and contraction amount of the steering cylinder 111L or 111R detected by the expansion and contraction sensor.

In the present description, "malfunction" refers to a state where correspondence between an input and an output in a component (for example, a main circuit, a sub circuit, or a steering lever 11) deviates from a predetermined allowable range. More specifically, a malfunction in a main circuit refers to a situation where a pressure (output) of the first pilot pressure oil corresponding to a steering signal (input) deviates from an allowable range like at Step S14. A malfunction in the sub circuit refers to a situation where a pressure (output) of the second pilot pressure oil corresponding to a steering signal (input) deviates from an allowable range like at Step S19. A malfunction in the steering lever 11 refers to a situation where a steering signal R or L (output) corresponding to a tilt (input) of the steering lever 11 does not match the original characteristic (absolute values match and signs are inverted) like at Step S17.

Figure 8:
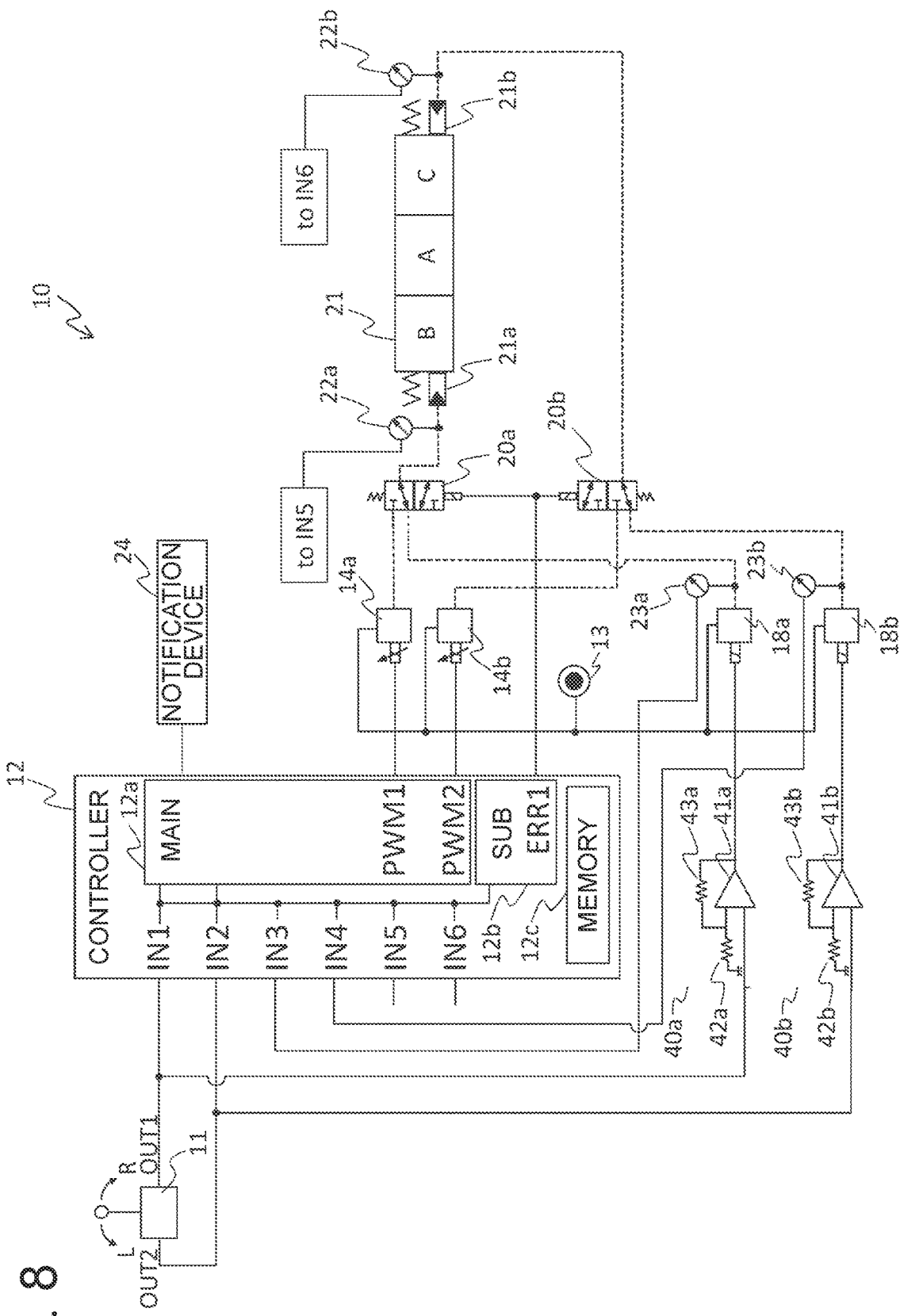
FIG. 8 is a block diagram of a steering circuit according to a modification.

Further, the diodes 15a and 15b and the relays 16a and 16b are examples constituting an amplifier circuit that amplifies and outputs a steering signal as an instruction signal. A concrete configuration of an amplifier circuit, however, is not limited to the example of FIG. 2. As another example, the steering circuit 10 may include amplifier circuits 40a and 40b shown in FIG. 8 instead of the amplifier circuit including the diodes 15a and 15b and the relays 16a and 16b. FIG. 8 is a block diagram of a steering circuit 10 including the amplifier circuits 40a and 40b.

As shown in FIG. 8, the amplifier circuit 40a is a non-inverting amplifier circuit including an operational amplifier 41a and resistors 42a and 43a. Likewise, the amplifier circuit 40b is a non-inverting amplifier circuit including an operational amplifier 41b and resistors 42b and 43b. A steering signal outputted from the steering lever 11 is inputted to an input terminal VIN and outputted as an amplified instruction signal from an output terminal VOUT to the solenoid valve 18a or 18b. In a case where the resistance value of the resistors 42a and 42b is defined as R1 and the resistance value of the resistors 43a and 43b is defined as R2, the amplification rate of the amplifier circuits 40a and 40b is represented by the expression $VOUT = \{(R_1 + R_2)/R_1\} \times VIN$.

Further, in the above embodiment, the example of mounting the steering circuit 10 shown in FIG. 2 on the wheel loader 100 has been explained. A concrete example of a work machine, however, is not limited to the wheel loader 100 and may also be an excavator car, a dump truck, and the like. Furthermore, in the above embodiment, a steering wheel capable of outputting a voltage may be used instead of the steering lever 11.

REFERENCE SIGNS LIST 10 steering circuit
11 steering lever (steering device)
12 controller
12a main controller
12b sub controller
12c memory
13 pressure source
14a, 14b proportional solenoid pressure reducing valve
15a, 15b diode
16a, 16b relay
17 power source
18a, 18b solenoid valve
20a, 20b switching valve
21 directional control valve
21a, 21b pilot chamber
22a, 22b first pressure sensor
23a, 23b second pressure sensor
24 notification device
31a, 31b input voltage-target pilot pressure table
32a, 32b target pilot pressure-target solenoid current table
33a, 33b PWM driver
40a, 40b amplifier circuit
41a, 41b operational amplifier
42a, 42b, 43a, 43b resistor
100 wheel loader (work machine)
101 lift arm
102 bucket
103 front wheel
104 front frame
105 cab
106 rear wheel
107 rear frame 108 lift arm cylinder
109 bucket cylinder
110 connecting shaft
111L, 111R steering cylinder (steering actuator)

The invention claimed is:

1. A work machine comprising:
a hydraulic pump;
a steering actuator; and
a directional control valve to control a pressure oil supplied from the hydraulic pump and supplied to the steering actuator;
the work machine actuating the steering actuator by the directional control valve controlled by a steering signal outputted from a steering device according to an amount of the operation by an operator,
wherein the work machine comprises:
a proportional solenoid valve for outputting a first pilot pressure oil with a pressure responding to the steering signal;
a solenoid valve for outputting a second pilot pressure oil with a predetermined pressure while the steering signal is outputted from the steering device;
a switching valve capable of switching to a first state of outputting the first pilot pressure oil to the directional control valve and a second state of outputting the second pilot pressure oil to the directional control valve, while the first pilot pressure oil is outputted from the proportional solenoid valve and the second pilot pressure oil is outputted from the solenoid valve in parallel; and
a controller to switch the switching valve from the first state to the second state in a case where a malfunction is detected in a main circuit ranging from the steering device to the directional control valve via the proportional solenoid valve and the switching valve of the first state; and
the work machine further comprises:
a memory to store a conversion table showing a target pressure of the first pilot pressure oil corresponding to the steering signal; and
a first pressure sensor to measure a pressure of the first pilot pressure oil supplied from the switching valve of the first state to the directional control valve,
wherein the controller detects a malfunction in the main circuit according to a difference between a target pressure specified on the basis of the steering signal and the conversion table and a pressure measured by the first pressure sensor being equal to or greater than a threshold value.

2. The work machine according to claim 1,
wherein the proportional solenoid valve outputs the first pilot pressure oil with a pressure responding to a positive steering signal of paired steering signals outputted from the steering device; and
the work machine further comprises a notification device to notify a malfunction in the steering device according to a difference between absolute values of the paired steering signals being equal to or greater than a predetermined value or signs of the paired steering signals being identical.

3. A work machine comprising:
a hydraulic pump;
a steering actuator; and
a directional control valve to control a pressure oil supplied from the hydraulic pump and supplied to the steering actuator;
the work machine actuating the steering actuator by the directional control valve controlled by a steering signal outputted from a steering device according to an amount of the operation by an operator,
wherein the work machine comprises:
a proportional solenoid valve for outputting a first pilot pressure oil with a pressure responding to the steering signal;
a solenoid valve for outputting a second pilot pressure oil with a predetermined pressure while the steering signal is outputted from the steering device;
a switching valve capable of switching to a first state of outputting the first pilot pressure oil to the directional control valve and a second state of outputting the second pilot pressure oil to the directional control valve, while the first pilot pressure oil is outputted from the proportional solenoid valve and the second pilot pressure oil is outputted from the solenoid valve in parallel; and
a controller to switch the switching valve from the first state to the second state in a case where a malfunction is detected in a main circuit ranging from the steering device to the directional control valve via the proportional solenoid valve and the switching valve of the first state; and
the work machine further comprises:
a diode that passes only the steering signal corresponding to the steering device operated in a predetermine direction; and
a relay to output an instruction signal for causing the solenoid valve to output the second pilot pressure oil according to the diode having passed the steering signal.

4. The work machine according to claim 3, further comprising:
a second pressure sensor to measure a pressure of the second pilot pressure oil outputted from the solenoid valve; and
a notification device to notify a malfunction in a sub circuit ranging from the steering device to the solenoid valve via the diode and the relay according to a pressure measured by the second pressure sensor being lower than a predetermined value while the steering signal corresponding to the steering device operated in a predetermined direction is outputted.

5. The work machine according to claim 3,
wherein the proportional solenoid valve outputs the first pilot pressure oil with a pressure responding to a positive steering signal of paired steering signals outputted from the steering device; and
the work machine further comprises a notification device to notify a malfunction in the steering device according to a difference between absolute values of the paired steering signals being equal to or greater than a predetermined value or signs of the paired steering signals being identical.

* * * * *